(12) United States Patent
Heidloff et al.

(10) Patent No.: US 7,543,031 B2
(45) Date of Patent: Jun. 2, 2009

(54) PUBLICATION TO SHARED CONTENT SOURCES USING NATURAL LANGUAGE ELECTRONIC MAIL DESTINATION ADDRESSES AND INTEREST PROFILES REGISTERED BY THE SHARED CONTENT SOURCES

(75) Inventors: Niklas Heidloff, Satzkotten (DE); Michael R. O'Brien, Westford, MA (US); Hardy Groeger, Bad Lippspringe (DE)

(73) Assignee: International Business Machines Corporation, Armonk, NY (US)

( * ) Notice: Subject to any disclaimer, the term of this patent is extended or adjusted under 35 U.S.C. 154(b) by 914 days.

(21) Appl. No.: 11/078,827

(22) Filed: Mar. 11, 2005

(65) Prior Publication Data
US 2006/0206578 A1   Sep. 14, 2006

(51) Int. Cl.
*G06F 15/16* (2006.01)
(52) U.S. Cl. ...................................... 709/206
(58) Field of Classification Search .................. 709/206
See application file for complete search history.

(56) References Cited

U.S. PATENT DOCUMENTS

| 6,146,026 | A | 11/2000 | Ushiku | |
|---|---|---|---|---|
| 6,684,239 | B1 | 1/2004 | Flepp et al. | |
| 2002/0174186 | A1* | 11/2002 | Hashimoto et al. | 709/206 |
| 2004/0051735 | A1* | 3/2004 | Daniel | 345/752 |
| 2006/0041621 | A1* | 2/2006 | Libbey | 709/206 |

* cited by examiner

*Primary Examiner*—George C Neurauter, Jr.
(74) *Attorney, Agent, or Firm*—David A. Dagg

(57) ABSTRACT

A system that enables users to conveniently and intuitively send email messages that automatically publish information in appropriate shared content sources. The system allows users to send email messages to shared sources based on keywords within text entered as destination email addresses. The shared sources register interest in certain topics by registering keywords with the email server system. An email server program then sends the email messages it receives for publication to the appropriate shared source(s) based on matching text in the destination address fields of the received messages with the keywords registered by the shared sources.

9 Claims, 2 Drawing Sheets

PUBLICATION TO SHARED CONTENT SOURCES USING NATURAL LANGUAGE ELECTRONIC MAIL DESTINATION ADDRESSES AND INTEREST PROFILES REGISTERED BY THE SHARED CONTENT SOURCES

FIELD OF THE INVENTION

The present invention relates generally to computer application programs, and more specifically to a system and method for publication to shared sources using natural language electronic mail addresses and interest profiles registered by shared content sources.

BACKGROUND OF THE INVENTION

In existing computer systems, a user can publish information to other users in an enterprise by sending electronic mail ("email") messages to multiple recipients, or by putting documents in shared content sources, such as databases or repositories. However, publication by email message to multiple recipients is problematic, in that the resulting email messages appear in the destination users' inboxes, even if they are not important to that receiving user. This may cause a flooding problem in the inbox. For many users, such email publications are undesirable, almost like spam.

In an alternative approach, information is published by placement in a shared content source, to which users can navigate when they want to look for certain information. However, there are also problems with the publication of information to such shared sources. A user may not know which shared source to use to publish which information. A user may not know whether a shared source exists for publication of the information, or the location of an appropriate shared source. Additionally, it may be undesirable to publish the information in multiple shared sources when multiple shared sources exist in which the information could be published in. Overall, publication through shared sources is frequently inconvenient and time consuming, and users accordingly are discouraged from publishing information that could advantageously be shared.

Some existing systems include the concept of mail-in databases that have email addresses. These systems allow a user to email messages to shared sources in order to publish information. These solutions have been significantly limited, however, in that users still often do not know the appropriate email address(es) of the shared source(s).

For the above reasons it would be desirable to have a new system for users to conveniently share information with multiple other users. The system should be intuitive in the way it operates, such that users can easily store the information to be published within the shared sources.

SUMMARY OF THE INVENTION

To address the above described and other deficiencies of the prior art, a method and system are disclosed that enable users to conveniently and intuitively send email messages to publish information in shared content sources. The disclosed system operates by allowing users to send email messages to shared sources by using natural language destination email addresses. Text in the destination address is parsed for keywords, which may include topics or phrases, that have been registered as interest profiles associated with corresponding shared sources. If a match with a keyword is found, the message is forwarded to a predetermined email destination associated with the shared source that registered the keyword as part of its interest profile. Thus the message is published through the shared source that is interested in the message. Comparison of the text contained in the destination address field to registered keywords may be performed by an email server system. Shared sources themselves may operate to register interest in certain keywords through the email server system.

Thus there is disclosed a new system for users to conveniently share information with multiple other users. The disclosed system operates in an intuitive way, so that users can easily store the information to be published within the appropriate shared sources.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
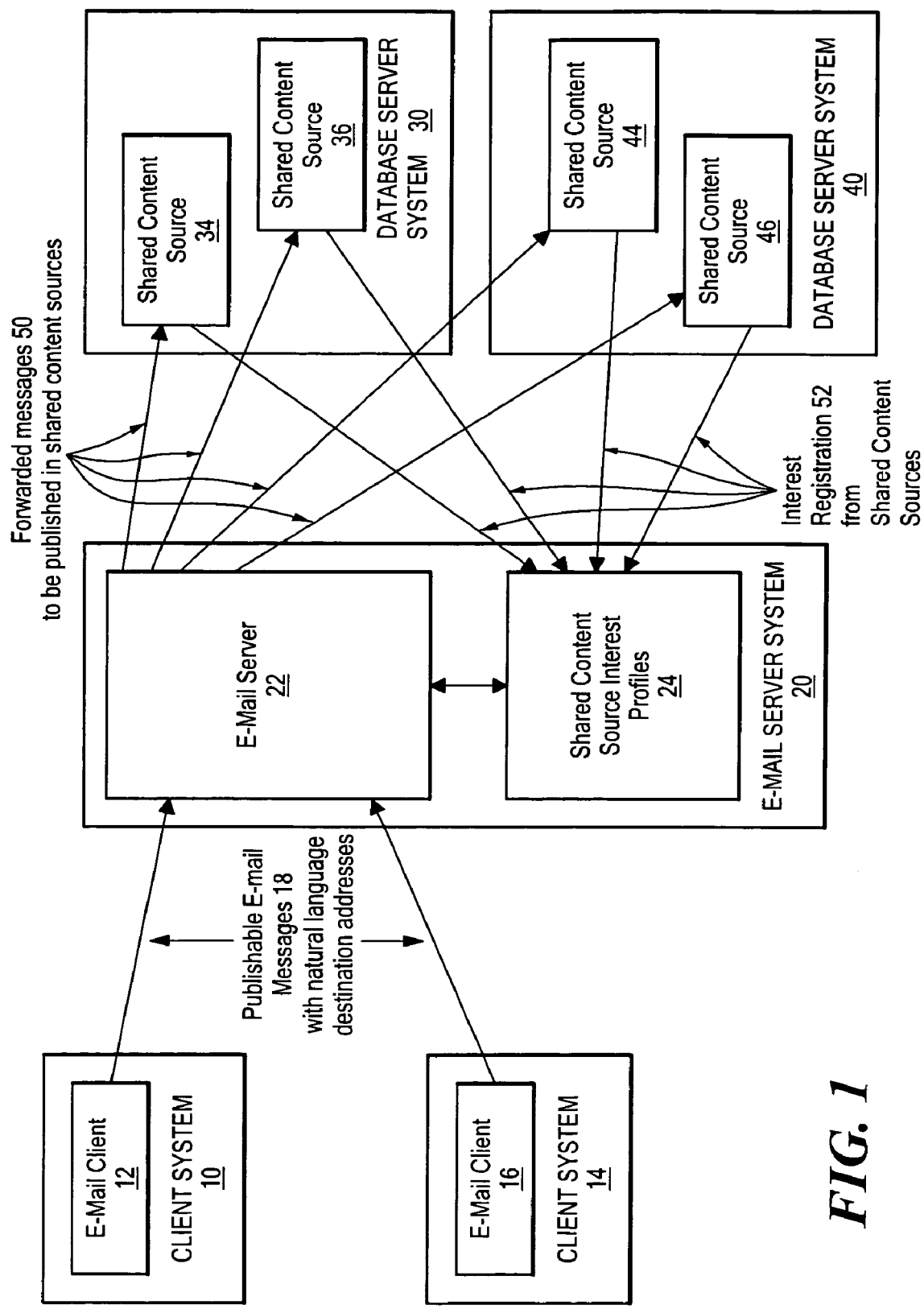
FIG. 1 shows software components in an illustrative embodiment.

As shown in FIG. 1, an illustrative embodiment of the disclosed system operates using a number of software components executing on at least one client computer system, shown for purposes of illustration as client system 10 and client system 14, at least one email server computer system, shown for purposes of illustration as email server system 20, and at least one shared content source server computer system, shown for purposes of illustration as database server system 30 and database server system 40. The client systems 10 and 14, email server system 20, and database server systems 30 and 40 may, for example, each include at least one processor, program storage, such as memory, for storing program code executable on the processor, and one or more input/output devices and/or interfaces, such as data communication and/or peripheral devices and/or interfaces. The client systems 10 and 14, email server system 20, and database server systems 30 and 40 are communicably connected by a data communication system, such as a Local Area Network (LAN), the Internet, or the like. The client systems 10 and 14, email server system 20, and database server systems 30 and 40 may further include appropriate operating system software.

The client system 10 is shown including an e-mail client component 12, and the client system 14 is shown including an e-mail client component 16. The email clients 12 and 16 are each capable of providing a graphical user interface through which a user can define email messages, including message body, attachments, destination email addresses, and any other appropriate message attributes for a given implementation. The user interface provided by the email clients 12 and 16 further enables a user to provide an indication that an email message is to be treated as publishable. Such indication may be provided, for example, by the user including a predetermined command string within a destination address or "TO:" field value, such as "publish:", "publish to:", or any other predetermined string. Such indication may alternatively be provided through other interface features, for example, by a mouse click on a graphical display object, such as a "PUBLISH" button, or some other appropriate mechanism. As a result of the indication to the email client that a message is publishable, that message is marked by some indication recognized by a receiving email server to indicate that the message is not a normal email message, but is to be processed as a publishable message. The user interface further allows for receipt of a user-provided natural language destination address value. For example the natural language destination address value may include free text to be matched by a receiving email server against keywords stored in a shared source interest profile registry.

The email server system 20 is shown including an email server software component 22, as well as shared content source interest profiles 24. The shared content source interest profiles 24 are an example of a shared source interest profile registry. The shared content source interest profiles 24 include associations between keywords and email addresses of shared content sources. The keywords may consist of words or phrases that represent topics relating to corresponding shared content sources. A given keyword may correspond to multiple shared content sources, in which case it may be associated with multiple shared content source email addresses. The shared content source interest profiles 24 are searchable by keyword to determine the associated shared content source email addresses. The shared content source interest profiles 24 include an interface for adding, modifying or deleting associations between keywords and shared content source email addresses.

The email server 22 may operate as what is generally referred to as a "mail server", "mail transport agent" (MTA), "mail router" or "Internet mailer". It is an application program that is operable to receive incoming email messages from local users, such as users within an associated domain, as well as from remote senders, and to forward outgoing email messages. For example, the email server 22 may use SMTP (Simple Mail Transfer Protocol) or ESMTP (extended SMTP) for sending email messages, and either POP3 (Post Office Protocol 3) or IMAP (Internet Message Access Protocol) for receiving email messages.

The database server system 30 is shown including shared content sources 34 and 36, and the database server system 40 includes shared content sources 44 and 46. The shared content sources 34, 36, 44 and 46 may include any appropriate software allowing for receipt of email messages within the forwarded messages 50 that are addressed to email addresses associated with respective ones of the shared content sources 34, 36, 44 and 46. Moreover, the shared content sources 34, 36, 44 and 46 are further operable to store the contents of received email messages that are addressed to respective ones of the shared content sources 34, 36, 44 and 46. For example, the shared content source 34 is operable to receive forwarded email messages sent to a destination email address associated with the shared content source 34, and to store such received messages, the shared content source 36 is operable to receive forwarded email messages sent to a destination email address associated with the shared content source 36, etc.

The shared content sources 34, 36, 44 and 46 may consist of databases, repositories, teamrooms, or any other specific kind of shared content source. The shared content sources 34, 36, 44 and 46 are further operable to register keywords in the shared content source interest profiles 24 by sending interest registrations 52 to the email server system 20. The registered keywords may, for example, consist of text words or phrases representing topics of interest associated with respective ones of the shared content sources 34, 36, 44 and 46.

During operation of the components shown in FIG. 1, the email clients 12 and 16 in the client systems 10 and 14 generate and send publishable email messages 18 having natural language destination address values to the email server 22 in the email server 20. The email server 22 determines that the email messages 18 are to be processed as publishable email messages, and compares the text in the natural language destination address values they contain with keywords in the shared content source interest profiles 24. If a match is found, then the associated one of the publishable email messages 18 is forwarded as one of the forwarded messages 50 with a destination email address associated with the shared content source that registered the matching keyword.

In one embodiment, if a shared content source registers multiple keywords, publishable messages are only forwarded to that shared content source if all the registered keywords for that shared content source are found in the destination address field of the message. This represents a logical "AND" of all registered keywords for a shared content source. Alternatively, a logical "OR" approach could be used, such that the message is forwarded to the shared content source if at least one registered keyword for that shared content source is found in the destination address field. If no shared content source has registered a keyword matching text in the destination address field of a publishable message, that message may be sent to a shared content source that is defined and maintained to stores such 'dead' messages.

Figure 2:
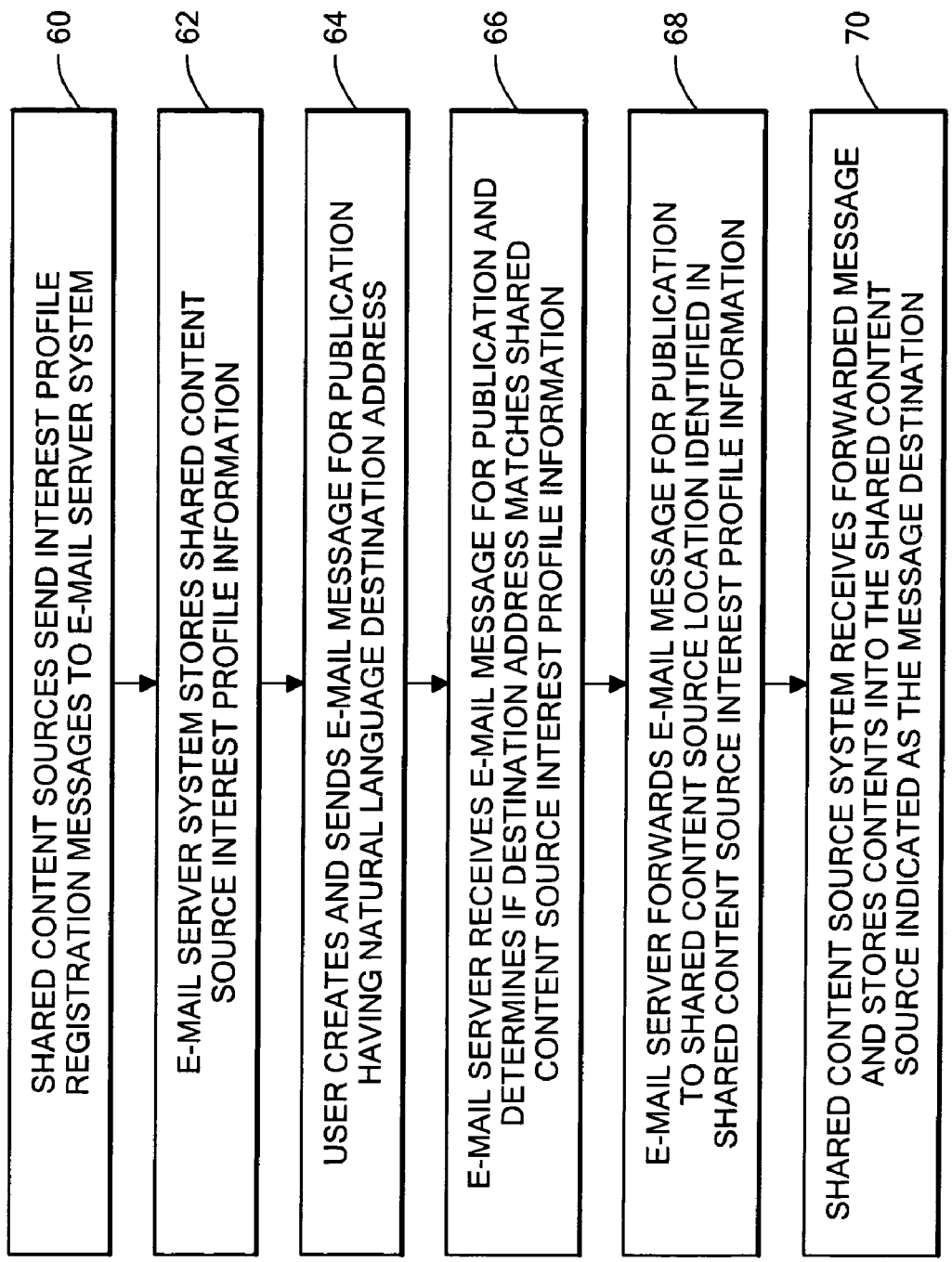
FIG. 2 shows steps performed in the illustrative embodiment.

FIG. 2 is a flow chart illustrating steps performed by an illustrative embodiment of the disclosed system. At step 60, one or more shared content sources send interest profile registration messages to an email server system. Alternatively, the email server system may act at step 60 to obtain interest profile information either from one or more directories or other structures into which the shared content sources store their respective interest profile information, or directly from the individual shared content sources themselves. At step 62, registration messages or the like are received by the email server system, and software components on the email server system operate to store the shared content source interest profile information. For example, the shared content source interest profile information may include keywords and shared content source email addresses to be associated with those keywords. In response, software components on the email server system form associations in a database of shared content source interest profile information between the keywords and the email addresses.

At step 64, a user creates and sends an email message for publication that has a natural language destination address. For example, using an embodiment of the disclosed system, a user can create an email message with a destination or "TO:" field value of "publish: RCP, smart client, Eclipse". In this example, the predetermined command string "publish:" is followed by free text consisting of a comma separated list of keywords such as words, acronyms, phrases or other text strings. Various other techniques may be used to indicate the publishability of a message. For example, the email client may present a graphical user interface button display object that can be clicked on by the user, causing a given message to be considered publishable.

Indication that a given message is publishable may also be provided in various ways. For example, a publishable message may be marked internally by using a special MIME (Multipurpose Internet Mail Extensions) content type. Any appropriate indication may be used for a given embodiment.

The publishable email message is received by the email server system at step 66. The email server system determines that the email message is to be processed as a publishable email message in response to finding the predetermined command string "publish:" in the destination address field value.

As a result, the free text in the destination address value is compared with keywords in the shared content source interest profile information. If any of the strings "RCP", "smart client", or "Eclipse" matches a registered keyword, the message is forwarded to the email address of the associated shared content source. For example, a shared content source with an email address of "RCPTeamroom@us.ibm.com" may have previously registered one or more of the keywords "RCP", "smart client" and "Eclipse." In that case, a simple matching algorithm would find at least one match between the natural language destination address value and the registered keywords. In response to that match, the email server system would operate to forward the publishable email message to the email address "RCPTeamroom@us.ibm.com" at step 68. At step 70, the shared content source system receives the forwarded publishable email message, and stores the contents of the message in the shared content source indicated by the destination address of the email message.

FIGS. 1-2 are block diagram and flowchart illustrations of methods, apparatus(s) and computer program products according to an embodiment of the invention. It will be understood that each block of FIGS. 1-2, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative program command structures, one skilled in the art will recognize that they may be embodied using a variety of specific command structures.

We claim:

1. A method of publishing information to multiple users, comprising:
   receiving at least one interest profile registration request from a shared content source, wherein said request includes at least one keyword;
   storing said keyword in an interest profile registry in association with an electronic mail address of said shared content source;
   receiving a publishable electronic mail message, said message including a natural language destination address;
   comparing said natural language destination address with said keyword stored in said interest profile registry; and
   in the event that at least part of said natural language destination address matches said keyword stored in said interest profile registry, forwarding said publishable electronic mail message to said electronic mail address of said shared content source.

2. The method of claim 1, further comprising:
   inputting said publishable electronic mail message through a user interface provided on a client computer system.

3. The method of claim 2, wherein said inputting said publishable electronic mail message further comprises inputting a predetermined command string in said natural language destination address.

4. The method of claim 2, wherein said inputting said publishable electronic mail message further comprises detecting user selection of a predetermined user interface display object.

5. The method of claim 4, wherein said detecting user selection of said predetermined user interface display object comprises at least one mouse click on a button display object.

6. The method of claim 1, further comprising:
   receiving said forwarded publishable electronic mail message at a shared content source server system;
   determining said shared content source responsive to said electronic mail address of said shared content source; and
   storing at least a portion of said publishable electronic mail message in said shared content source.

7. The method of claim 1, wherein said shared content source comprises a shared database.

8. The method of claim 1, wherein said natural language destination address comprises a plurality of keywords to be compared to a plurality of keywords stored in said interest profile registry.

9. The method of claim 1, wherein said steps are performed by an electronic mail server.

* * * * *